United States Patent
Towsley

(10) Patent No.: US 6,881,234 B2
(45) Date of Patent: Apr. 19, 2005

(54) METHOD FOR MAKING ELECTRODES FOR NICKEL-METAL HYDRIDE BATTERIES

(76) Inventor: Frank E. Towsley, 301 Richard Ct., Midland, MI (US) 48640

( * ) Notice: Subject to any disclaimer, the term of this patent is extended or adjusted under 35 U.S.C. 154(b) by 91 days.

(21) Appl. No.: 10/637,481

(22) Filed: Aug. 8, 2003

(65) Prior Publication Data

US 2005/0029105 A1 Feb. 10, 2005

(51) Int. Cl.⁷ .................. H01M 6/00; H01M 10/44; H01M 4/02; H01M 4/29
(52) U.S. Cl. .................. 29/623.5; 29/623.1; 205/57; 205/60
(58) Field of Search .................. 29/623.4, 623.5; 429/231.7, 233, 59, 229, 223, 231.1, 162, 34, 40, 231.95, 231.3, 234, 218.2, 235, 176, 44, 27, 30, 241, 94, 246, 20, 126; 204/293, 338, 269, 265; 427/172; 428/402; 205/338, 60; 502/185, 180; 141/98; 95/96; 55/385.1; 96/4; 422/280; 420/402; 249/245

(56) References Cited

U.S. PATENT DOCUMENTS

| | | | |
|---|---|---|---|
| 2,737,541 A | * | 3/1956 | Coolidge .................. 429/223 |
| 4,053,371 A | | 10/1977 | Towsley |
| 4,121,992 A | | 10/1978 | Towsley |
| 4,623,597 A | | 11/1986 | Sapru et al. |
| 5,640,669 A | * | 6/1997 | Harada et al. .................. 428/552 |
| 5,856,047 A | | 1/1999 | Venkajesan et al. |
| 6,416,903 B1 | | 7/2002 | Fierro et al. |
| 6,582,483 B1 | * | 6/2003 | Morishita et al. .......... 29/623.5 |

* cited by examiner

Primary Examiner—Bruce F. Bell
Assistant Examiner—Robert Hodge
(74) Attorney, Agent, or Firm—Timothy S. Stevens

(57) ABSTRACT

A method for making the anode (or the cathode) of a nickel-metal hydride battery by electrodepositing a metal in the interstitial spaces a bed of metal-hydride active material particles (or electrodepositing a metal in the interstitial spaces of a bed of nickel hydroxide particles). Alternatively, the anode (or cathode) can be made by pressing metal-hydride active material particles (or nickel hydroxide particles) into a cellular metal substrate formed by electrodepositing a metal in the interstitial spaces of a bed of particles. Or, the anode (or cathode) can be made by flowing a suspension of metal-hydride active material particles (or nickel hydroxide particles) through a cellular metal substrate formed by electrodepositing a metal in the interstitial spaces of a bed of particles.

34 Claims, 3 Drawing Sheets

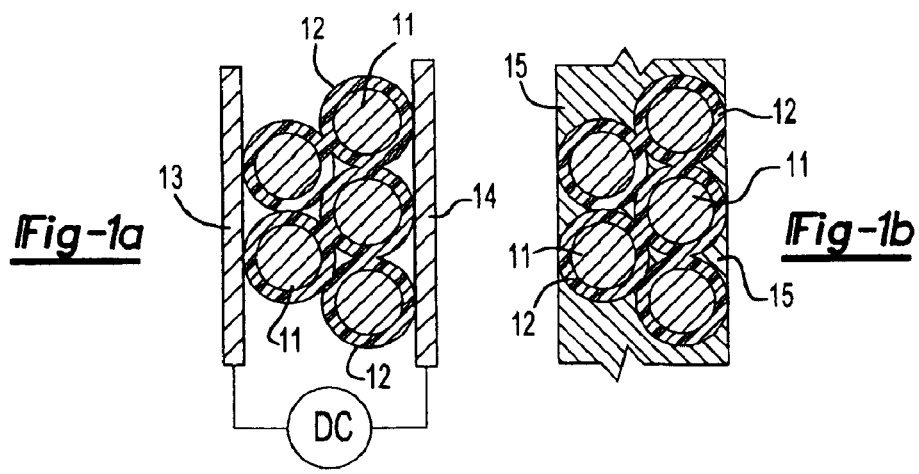
*Fig-1a*  *Fig-1b*
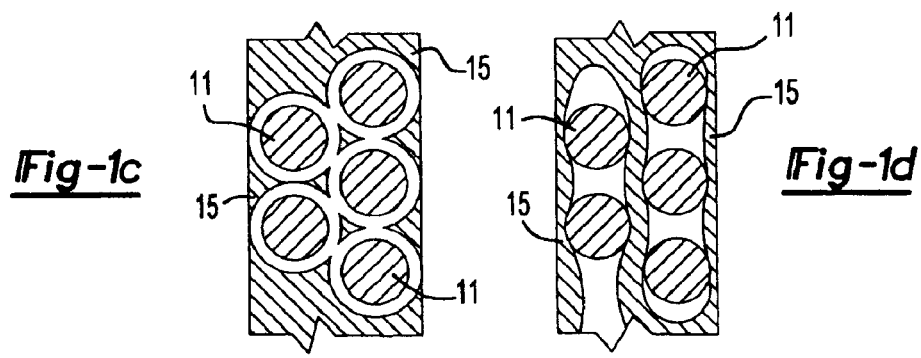
*Fig-1c*  *Fig-1d*
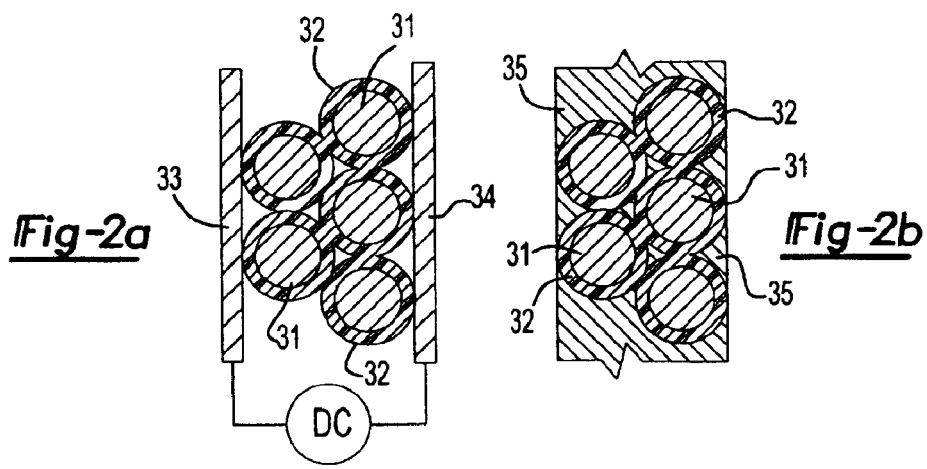
*Fig-2a*  *Fig-2b*
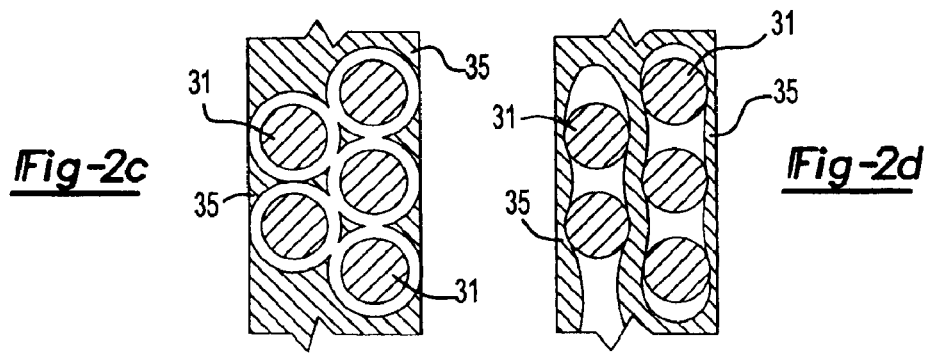
*Fig-2c*  *Fig-2d*

METHOD FOR MAKING ELECTRODES FOR NICKEL-METAL HYDRIDE BATTERIES

FIELD OF THE INVENTION

The instant invention relates generally to nickel-metal hydride batteries and more specifically to methods for making one or both electrodes for nickel-metal hydride batteries.

BACKGROUND

A nickel-metal hydride battery usually incorporates an anode comprising a metal-hydride active material and a cathode comprising nickel hydroxide. The anode and cathode are immersed in an electrolyte (such as an aqueous potassium hydroxide solution) and Separated by a porous separator. Stanford R. Ovshinsky and co-workers significantly improved the nickel-metal hydride battery by incorporating disordered (amorphous) metal-hydride active materials into the anode, see U.S. Pat. No. 4,623,597, herein fully incorporated by reference. Ovshinsky and co-workers continued to improve the nickel-metal hydride battery. For example, Ovshinsky and co-workers improved the capacity and peak power of the nickel-metal hydride battery by pressing powdered metal-hydride active materials into porous metal substrates to form the anode and by pressing or pasting powdered nickel hydroxide into porous metal substrates to form the cathode, see U.S. Pat. Nos. 5,856,047 and 6,416,903, herein fully incorporated by reference.

Frank E. Towsley invented a porous cellular metal structure made, for example, by electrodepositing a metal in the interstitial spaces of a compacted bed of polystyrene particles followed by dissolution of the polystyrene, see U.S. Pat. No. 4,053,371, herein fully incorporated by reference. Towsley used such a porous cellular metal, for example, in an improved electrolytic cell, see U.S. Pat. No. 4,121,992, herein fully incorporated by reference, and Towsley suggested a number of other applications such as a filtration membrane, an electrode assembly for batteries, lightweight structural members, impact energy absorbers, and abrasive grinding combinations, see U.S. Pat. No. 4,053,371.

Despite the significant improvements made to nickel-metal hydride batteries, there is a continuing need to increase the capacity and/or peak power characteristics of nickel-metal hydride batteries.

SUMMARY OF THE INVENTION

The instant invention provides a number of methods for making improved anodes and improved cathodes for nickel-metal hydride batteries, said batteries having improved properties such as increased capacity and/or increased peak power characteristics. The instant invention is an extension of the above-referenced work of Frank E. Towsley into the field of nickel-metal hydride batteries.

In one embodiment related to a method for making an anode for a nickel-metal hydride battery, the anode is made to increase the electrical contact of the metal-hydride active material particles with the metal substrate of the anode by a method comprising the steps of: (a) pressing coated metal-hydride active material particles to form a porous structure comprising the coated metal-hydride active material particles and interstitial spaces between the coated metal-hydride active material particles, the coating of the coated metal-hydride active material particles being an electrical insulator; (b) placing an aqueous solution of an electrolyte in the interstitial spaces, the electrolyte suitable for the electrolytic deposition of a metal; (c) positioning the porous structure in an electrolytic cell; (d) applying a direct current potential between the anode of the electrolytic cell and the cathode of the electrolytic cell to electrolytically deposit a continuous interconnected network of metal in the interstitial spaces, the metal being deposited progresively starting from the cathode of the electrolytic cell and extending through the porous structure toward the anode of the electrolytic cell; (e) removing the coating from the coated metal-hydride active material particles; and (f) compacting the continuous interconnected network of metal so that the metal of the continuous interconnected network of metal better contacts the metal-hydride active material particles. The coating is preferably polystyrene which can be removed in step (e) by dissolving the polystyrene with a solvent or by heating to vaporize the polystyrene.

In a related embodiment, the instant invention is a method for making a cathode for a nickel-metal hydride battery, the cathode is made to increase the electrical contact of the nickel hydroxide particles with the metal substrate of the cathode by a method comprising the steps of: (a) pressing coated nickel hydroxide particles to form a porous structure comprising the coated nickel hydroxide particles and interstitial spaces between the coated nickel hydroxide particles; (b) placing an aqueous solution of an electrolyte in the interstitial spaces, the electrolyte suitable for the electrolytic deposition of a metal; (c) positioning the porous structure in an electrolytic cell; (d) applying a direct current potential between the anode of the electrolytic cell and the cathode of the electrolytic cell to electrolytically deposit a continuous interconnected network of metal in the interstitial spaces, the metal being deposited progresively starting from the cathode of the electrolytic cell and extending through the porous structure toward the anode of the electrolytic cell; (e) removing the coating from the coated nickel hydroxide particles; and (f) compacting the continuous interconnected network of metal so that the metal of the continuous interconnected network of metal better contacts the nickel hydroxide particles. The coating is preferably polystyrene which can be removed in step (e) by dissolving the polystyrene with a solvent or by heating to vaporize the polystyrene.

In another embodiment, the instant invention is a method for making an anode for a nickel-metal hydride battery, comprising the step of pressing metal-hydride active material particles into a porous metal substrate, the porous metal substrate formed by electrodepositing a metal in the interstitial spaces of a packed array of substantially convex and substantially electrically nonconductive particles of a material and then substantially removing the material of the particles. The method can further comprise the step of compacting the anode so that the metal better contacts the metal-hydride active material particles. The metal (such as copper) can be additionally plated with a corrosion resistant metal (such as nickel).

In yet another embodiment, the instant invention is a method for making a cathode for a nickel-metal hydride battery, comprising the step of pressing nickel hydroxide particles into a porous metal substrate, the porous metal substrate formed by electrodepositing a metal in the interstitial spaces of a packed array of substantially convex and substantially electrically nonconductive particles of a material and then substantially removing the material of the particles. The method can further comprise the step of compacting the cathode so that the metal better contacts the nickel hydroxide particles. The metal (such as copper) can be additionally plated with a corrosion resistant metal (such as nickel).

In a yet further embodiment, the instant invention is a method for making an anode for a nickel-metal hydride battery, comprising the step of flowing a suspension of metal-hydride active material particles in a fluid through a porous metal substrate having a gradient of pore size from a pore size sufficiently large to allow the metal-hydride active material particles of the suspension to enter into the porous metal substrate but then be trapped in the porous metal substrate by smaller pores so that the pores of the porous metal substrate tend to fill with the metal-hydride active material particles, the porous metal substrate formed by electrodepositing a metal in the interstitial spaces of a packed array of substantially convex and substantially electrically nonconductive particles of a material and then substantially removing the material of the particles, the particle size of the packed array of particles being a gradient from large to small relative to the particle size of the metal-hydride active material particles. The method can further comprise the step of compacting the anode so that the metal better contacts the metal-hydride active material particles. The metal (such as copper) can be additionally plated with a corrosion resistant metal (such as nickel).

In a yet even further embodiment, the instant invention is a method for making a cathode for a nickel-metal hydride battery, comprising the step of flowing a suspension of nickel hydroxide particles in a fluid through a porous metal substrate having a gradient of pore size from a pore size sufficiently large to allow the metal-hydride active material particles of the suspension to enter into the porous metal substrate but then be trapped in the porous metal substrate by smaller pores so that the pores of the porous metal substrate tend to fill with the nickel hydroxide particles, the porous metal substrate formed by electrodepositing a metal in the interstitial spaces of a packed array of substantially convex and substantially electrically nonconductive particles of a material and then substantially removing the material of the particles, the particle size of the packed array of particles being a gradient from large to small relative to the particle size of the nickel hydroxide particles. The method can further comprise the step of compacting the cathode so that the metal better contacts the nickel hydroxide particles. The metal (such as copper) can be additionally plated with a corrosion resistant metal (such as nickel).

BRIEF DESCRIPTION OF THE DRAWINGS

FIG. 1 depicts an embodiment of the instant invention for making an anode for a nickel-metal hydride battery by electrodepositing copper in the interstitial spaces of a bed of polystyrene coated metal-hydride active material particles followed by removal of the polystyrene and then compaction of the anode;

FIG. 2 depicts an embodiment of the instant invention for making a cathode for a nickel-metal hydride battery by electrodepositing copper in the interstitial spaces of a bed of polystyrene coated nickel hydroxide particles followed by removal of the polystyrene and then compaction of the cathode;

DETAILED DESCRIPTION OF THE INVENTION

Figure 3A:
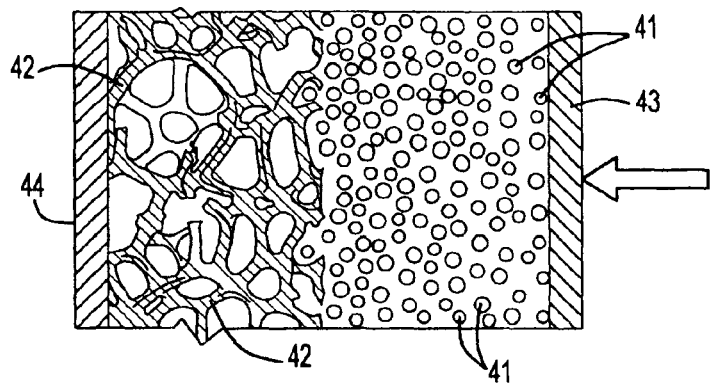
FIG. 3 depicts an embodiment of the instant invention for making an anode for a nickel-metal hydride battery by pressing or pasting metal-hydride active material particles into a cellular metal substrate.

Referring now to FIG. 1, therein is shown a depiction of a process embodiment of the instant invention for making an anode for a nickel-metal hydride battery. Referring to FIG. 1(a), metal-hydride active material particles 11 made according to the teachings of U.S. Pat. No. 4,623,597 is coated with a layer of polystyrene 12 and pressed to form a porous structure positioned between the cathode 13 and the anode 14 of an electrolytic cell. The metal-hydride active material particles 11 is coated with the layer of polystyrene 12 by spray drying a suspension of the metal-hydride active material particles 11, the suspension comprised of ten weight percent metal-hydride active material particles 11 and ten weight percent polystyrene in methylene chloride. An aqueous solution of an electrolyte comprising copper ion is positioned in the interstitial spaces of the porous structure. A direct current potential is applied between the anode 14 and the cathode 13 to electrolytically deposit a continuous interconnected network of copper metal in the interstitial spaces of the porous structure, the metal being deposited progresively starting from the cathode 13 toward the anode 14. Such deposition is preferably terminated before the deposition reaches the anode 14 to prevent short circuiting the electrolytic cell.

The continuous interconnected network of copper 15 containing the coated metal-hydride active material particles as shown in FIG. 1(b) is then washed with methylene chloride to dissolve the polystyrene coating 12 from the metal-hydride active material particles 11 to produce the structure shown in FIG. 1(c) consisting of the interconnected network of copper 15 and the metal-hydride active material particles 11 entrapped therein. The structure shown in FIG. 1(c) is then compacted by passing the structure through steel rollers to produce the structure shown in FIG. 1(d) so that the continuous interconnected network of copper 15 better contacts the metal-hydride active material particles 11. Alternatively, the continuous interconnected network of metal can be MONEL brand metal (or other corrosion resistant metal) for the same reasons that the porous copper substrate of U.S. Pat. No. 5,856,047 was plated with nickel (or other corrosion resistant metal). The compacted structure shown in FIG. 1(d) is useful as an anode for a nickel-metal hydride battery.

Although spray drying is the preferred method of coating the metal-hydride active material particles with polystyrene (or other electrically insulating solvent soluble polymer), any suitable coating method can be used to form such coating. Although a soluble polymer is the preferred coating material for coating the metal-hydride active material particles with an electrical insulator, other materials can be used as long as they are electrical insulators, i.e., as long as the electrical current between the cathode 13 and the anode 14 shown in FIG. 1(a) is effective to electrolytically deposit the continuous interconnected network of copper (or other metal) in the interstitial spaces between the coated particles of metal-hydride active material. If the coating 12 is an electrical conductor (or if the particles of metal-hydride active material are uncoated), then the current between the cathode 13 and the anode 14 will be carried through the electrically conductive coating and particles so that no copper (or other metal) is electrolytically deposited in the interstitial spaces between the particles.

The composition of the aqueous solution of an electrolyte comprising copper ion (or other metal(s) ions) that is positioned in the interstitial spaces of the porous structure shown in FIG. 1(a) is important in the instant invention. Such solution is preferably a solution known to form a smooth continuous electrodeposited metal plating as well known in the plating art as a solution having good "throwing power" (see, for example, U.S. Pat. No. 4,206,019). Further teachings regarding the formation of a cellular metal structure can be found in U.S. Pat. No. 4,053,371. It should be understood that the term "metal" includes a pure metal (such as copper or nickel) as well as an alloy (such as brass).

The preferred method for removing the polystyrene coating 12 shown in FIG. 1(b) is the above-described solvent dissolution step. The solvent is preferably the same solvent used in the above-discussed preferred spray drying step. However, the coating 12 can be removed by any suitable means such as heating or roasting the structure shown in FIG. 1(b) to de-polymerize and vaporize the polystyrene coating 12.

Referring now to FIG. 2, therein is shown a depiction of a process embodiment of the instant invention for making a cathode for a nickel-metal hydride battery. Referring to FIG. 2(a), nickel hydroxide particles 31 (as specified, for example, in the teachings of U.S. Pat. No. 4,623,597) are coated with a layer of polystyrene 32 and pressed to form a porous structure positioned between the cathode 33 and the anode 34 of an electrolytic cell. The nickel hydroxide particles 31 are coated with the layer of polystyrene 32 by spray drying a suspension of the nickel hydroxide particles 31, the suspension comprised of ten weight percent nickel hydroxide particles and ten weight percent polystyrene in methylene chloride. An aqueous solution of an electrolyte comprising copper ion is positioned in the interstitial spaces of the porous structure. A direct current potential is applied between the anode 34 and the cathode 33 to electrolytically deposit a continuous interconnected network of copper metal in the interstitial spaces of the porous structure, the metal being deposited progresively starting from the cathode 33 toward the anode 34. Such deposition is preferably terminated before the deposition reaches the anode 34 to prevent short circuiting the electrolytic cell.

The continuous interconnected network of copper 35 containing the coated nickel hydroxide particles as shown in FIG. 2(b) is then washed with methylene chloride to dissolve the polystyrene coating 32 from the nickel hydroxide particles 31 to produce the structure shown in FIG. 2(c) consisting of the interconnected network of copper 35 and the nickel hydroxide particles 31 entrapped therein. The structure shown in FIG. 2(c) is then compacted by passing the structure through steel rollers to produce the structure shown in FIG. 2(d) so that the continuous interconnected network of copper 35 better contacts the nickel hydroxide particles 31. Alternatively, the continuous interconnected network of metal can be MONEL brand metal (or other corrosion resistant metal) for the same reasons that the porous copper substrate of U.S. Pat. No. 5,856,047 was plated with nickel (or other corrosion resistant metal). The compacted structure shown in FIG. 2(d) is useful as a cathode for a nickel-metal hydride battery.

Although spray drying is the preferred method of coating the nickel hydroxide particles with polystyrene (or other electrically insulating solvent soluble polymer), any suitable coating method can be used. Although a soluble polymer is the preferred coating material for coating the nickel hydroxide particles with an electrical insulator, other materials can be used as long as they are electrical insulators, i.e., as long as the electrical current between the cathode 33 and the anode 34 shown in FIG. 2(a) is effective to electrolytically deposit the continuous interconnected network of copper (or other metal) in the interstitial spaces between the coated particles of nickel hydroxide. If the coating 32 is an electrical conductor (or if the particles of nickel hydroxide are uncoated), then the current between the cathode 33 and the anode 34 will be carried through the electrically conductive coating and particles so that no copper (or other metal) is electrolytically deposited in the interstitial spaces between the particles.

The composition of the aqueous solution of an electrolyte comprising copper ion (or other metal(s) ions) that is positioned in the interstitial spaces of the porous structure shown in FIG. 2(a) is important in the instant invention. Such solution is preferably a solution known to form a smooth continuous electrodeposited metal plating as well known in the plating art as a solution having good "throwing power" (see, for example, U.S. Pat. No. 4,206,019). Further teachings regarding the formation of a cellular metal structure can be found in U.S. Pat. No. 4,053,371.

The preferred method for removing the polystyrene coating 32 shown in FIG. 2(b) is the above-described solvent dissolution step. The solvent is preferably the same solvent used in the above-discussed preferred spray drying step. However, the coating 32 can be removed by any suitable means such as heating or roasting the structure shown in FIG. 2(b) to de-polymerize and vaporize the polystyrene coating 32.

Figure 3B:
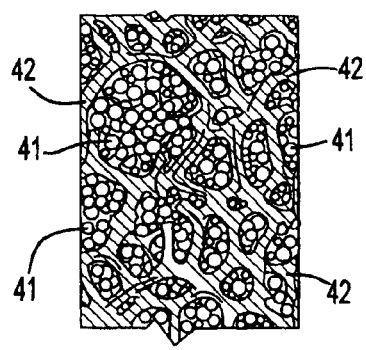

Referring now to FIG. 3, therein is shown a depiction of an embodiment of the instant invention for making an anode for a nickel-metal hydride battery. In this embodiment metal-hydride active material particles 41 are pressed into a porous metal substrate 42 by press plate 43 and backing plate 44 as shown in FIG. 3(a) to produce the anode shown in FIG. 3(b). See U.S. Pat. Nos. 5,856,047 and 6,416,903 for details regarding most of the aspects of this embodiment of the instant invention. It should be understood that the term "pressed or pressing" includes what the art calls "pasting". The improvement of the instant invention is the incorporation of the porous metal substrate 42. In the instant invention, the porous metal substrate is a substrate made by the teachings of U.S. Pat. No. 4,053,371. This substrate permits an anode for a nickel-metal hydride battery having improved surge current capability. When the substrate 42 is copper, then it is preferable to plate the copper with nickel for the same reasons that the porous copper substrate of U.S. Pat. No. 5,856,047 was plated with nickel (or other corrosion resistant metal). The structure shown in FIG. 3(b) can be compacted, for example by passing it through steel rollers, so that the metal of the substrate better contacts the metal-hydride active material particles.

Figure 4A:
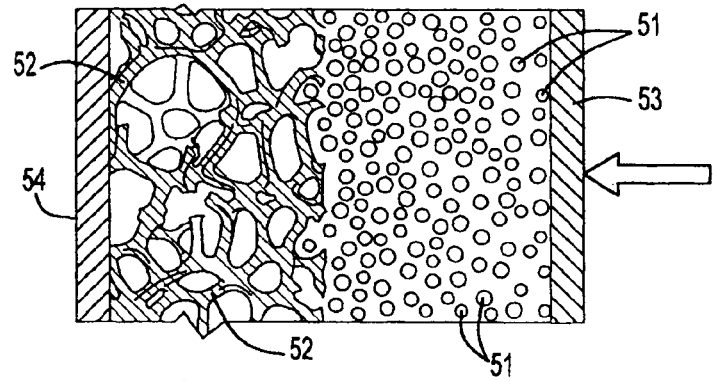
FIG. 4 depicts an embodiment of the instant invention for making a cathode for a nickel-metal hydride battery by pressing or pasting nickel hydroxide particles into a cellular metal substrate.
Figure 4B:
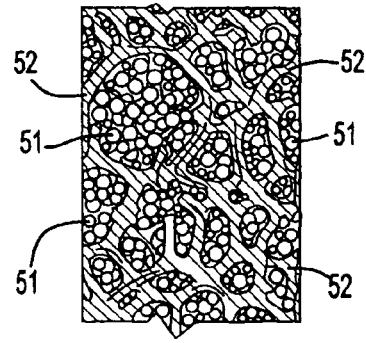

Referring now to FIG. 4, therein is shown a depiction of an embodiment of the instant invention for making a cathode for a nickel-metal hydride battery. In this embodiment nickel hydroxide particles 51 are pressed into a porous metal substrate 52 by press plate 53 and backing plate 54 as shown in FIG. 4(a) to produce the cathode shown in FIG. 4(b). See U.S. Pat. Nos. 5,856,047 and 6,416,903 for details regarding most of the aspects of this embodiment of the instant invention. It should be understood that the term "pressed or pressing" includes what the art calls "pasting". The improvement of the instant invention is the incorporation of the porous metal substrate 52. In the instant invention, the porous metal substrate is a substrate made by the teachings of U.S. Pat. No. 4,053,371. This substrate permits a cathode for a nickel-metal hydride battery having improved surge current capability. When the substrate 52 is copper, then it is preferable to plate the copper with nickel for the same reasons that the porous copper substrate of U.S. Pat. No. 5,856,047 was plated with nickel (or other corrosion resistant metal). The structure shown in FIG. 4(b) can be compacted, for example by passing it through steel rollers, so that the metal of the substrate better contacts the nickel hydroxide particles.

Figure 5A:
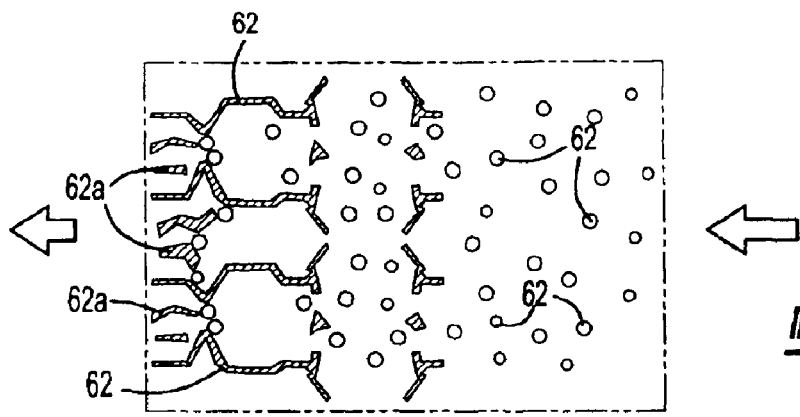
FIG. 5 depicts an embodiment of the instant invention for making an anode for a nickel-metal hydride battery by flowing a suspension of metal-hydride active material particles through a cellular metal substrate.
Figure 5B:
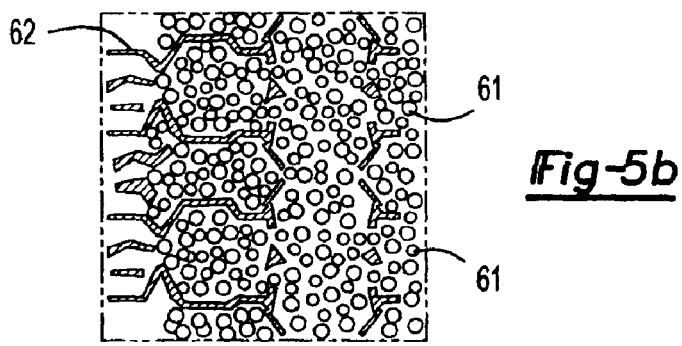

Referring now to FIG. 5, therein is shown a depiction of an embodiment of the instant invention for making an anode for a nickel-metal hydride battery by flowing a suspension of metal-hydride active material particles 61 through a cellular metal substrate 62 having a gradient of pore size from a pore size sufficiently large to allow the metal-hydride active material particles 61 of the suspension to enter into the porous metal substrate but then be trapped in the porous metal substrate by smaller pores 62a so that the larger pores of the porous metal substrate tend to fill with the metal-hydride active material particles as shown in FIG. 5(b). The porous metal substrate 62 is formed by electrodepositing a metal in the interstitial spaces of a packed array of substantially convex and substantially electrically nonconductive particles of a material and then substantially removing the material of the particles, the particle size of the packed array of particles being a gradient from large to small relative to the particle size of the metal-hydride active material particles (or alternatively by using adjacent "sinters" or "templates" of different sized particles). When the substrate 62 is copper, then it is preferable to plate the copper with nickel for the same reasons that the porous copper substrate of U.S. Pat. No. 5,856,047 was plated with nickel (or other corrosion resistant metal). The structure shown in FIG. 5(b) can be compacted, for example by passing it through steel rollers, so that the metal of the substrate better contacts the metal-hydride active material particles. The metal-hydride active material particles to be flowed through the porous metal substrate can be suspended in a liquid or in a gas.

Figure 6A:
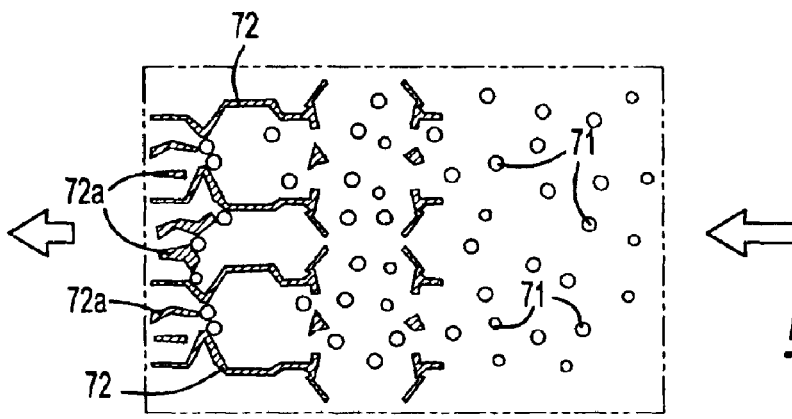
FIG. 6 depicts an embodiment of the instant invention for making a cathode for a nickel-metal hydride battery by flowing a suspension of a nickel hydroxide particles through a cellular metal substrate.
Figure 6B:
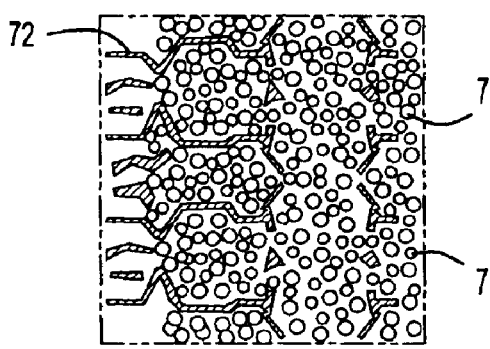

Referring now to FIG. 6, therein is shown a depiction of an embodiment of the instant invention for making a cathode for a nickel-metal hydride battery by flowing a suspension of a nickel hydroxide particles 71 through a cellular metal substrate 72 having a gradient of pore size from a pore size sufficiently large to allow the nickel hydroxide particles 71 of the suspension to enter into the porous metal substrate but then be trapped in the porous metal substrate by smaller pores 72a so that the larger pores of the porous metal substrate tend to fill with the nickel hydroxide particles as shown in FIG. 6(b). The porous metal substrate 72 is formed by electrodepositing a metal in the interstitial spaces of a packed array of substantially convex and substantially electrically nonconductive particles of a material and then substantially removing the material of the particles, the particle size of the packed array of particles being a gradient from large to small relative to the particle size of the nickel hydroxide particles (or alternatively by using adjacent "sinters" or "templates" of different sized particles). When the substrate 72 is copper, then it is preferable to plate the copper with nickel for the same reasons that the porous copper substrate of U.S. Pat. No. 5,856,047 was plated with nickel (or other corrosion resistant metal). The structure shown in FIG. 6(b) can be compacted, for example by passing it through steel rollers, so that the metal of the substrate better contacts the nickel hydroxide particles. The nickel hydroxide particles to be flowed through the porous metal substrate can be suspended in a liquid or in a gas.

A number of additional improvements are possible using the above embodiments of the instant invention. For example, the bulk density of the continuous interconnected network of metal can be reduced by contact of such a network with a metal solvent (such as an acid solution) or by electro etching the network. The bulk density of the continuous interconnected network of metal can also be decreased by electrodepositing the metal network in the interstitial spaces of a mixed bed of appropriately different sized nonconductive particles. The bulk density of the continuous interconnected network of metal can also be decreased by electrodepositing the metal network in the interstitial spaces of a highly compacted bed of deformable nonconductive particles such as polystyrene particles heated to one hundred and ten degrees Celsius which have been compacted in a mold to form a polymer "sinter" or "template" or by passing the bed through steel rollers so that the interstitial spaces in the bed are reduced in dimension and provide less volume for the electrodeposited metal network to occupy. It should be understood that a "sinter" or a "template" as described above is defined herein as a packed array of particles even when the particles have fused together. Conversely, the bulk density of the continuous interconnected network of metal can be increased by plating additional metal on the network or, of course, by compacting the network. The pore size and pore size distribution of the network is easily controlled by controlling the size and size distribution of the nonconductive particles and the degree of compaction of such particles. Thus, it is readily apparent that although the invention has been described in relation with its preferred embodiments, it should be understood that it is not limited thereby but is intended to cover all alternatives, modifications and equivalents that are included within the scope of the invention as defined by the following claims.

What is claimed is:

1. A method for making an anode for a nickel-metal hydride battery, comprising the steps of: (a) pressing coated metal-hydride active material particles to form a porous structure comprising the coated metal-hydride active material particles and interstitial spaces between the coated metal-hydride active material particles, the coating of the coated metal-hydride active material particles being an electrical insulator; (b) placing an aqueous solution of an electrolyte in the interstitial spaces, the electrolyte suitable for the electrolytic deposition of a metal; (c) positioning the porous structure in an electrolytic cell; (d) applying a direct current potential between the anode of the electrolytic cell and the cathode of the electrolytic cell to electrolytically deposit a continuous interconnected network of metal in the interstitial spaces, the metal being deposited progresively starting from the cathode of the electrolytic cell and extending through the porous structure toward the anode of the electrolytic cell; (e) removing the coating from the coated metal-hydride active material particles; and (f) compacting the continuous interconnected network of metal so that the metal of the continuous interconnected network of metal better contacts the metal-hydride active material particles.

2. The method of claim 1, wherein the metal is copper.

3. The method of claim 2, further comprising the step of plating nickel on the copper before step (f).

4. The method of claim 1, wherein the coating comprises polystyrene and step (e) comprises dissolving the coating with a polystyrene solvent.

5. The method of claim 2, wherein the coating comprises polystyrene and step (e) comprises dissolving the coating with a polystyrene solvent.

6. The method of claim 1, wherein the coating comprises polystyrene and step (e) comprises vaporizing the coating with heat.

7. The method of claim 2, wherein the coating comprises polystyrene and step (e) comprises vaporizing the coating with heat.

8. A method for making a cathode for a nickel-metal hydride battery, comprising the steps of: (a) pressing coated nickel hydroxide particles to form a porous structure comprising the coated nickel hydroxide particles and interstitial spaces between the coated nickel hydroxide particles, the coating of the coated nickel hydroxide particles being an electrical insulator; (b) placing an aqueous solution of an electrolyte in the interstitial spaces, the electrolyte suitable for the electrolytic deposition of a metal; (c) positioning the porous structure in an electrolytic cell; (d) applying a direct current potential between the anode of the electrolytic cell and the cathode of the electrolytic cell to electrolytically deposit a continuous interconnected network of metal in the interstitial spaces, the metal being deposited progressively starting from the cathode of the electrolytic cell and extending through the porous structure toward the anode of the electrolytic cell; (e) removing the coating from the coated nickel hydroxide particles; and (f) compacting the continuous interconnected network of metal so that the metal of the continuous interconnected network of metal better contacts the nickel hydroxide particles.

9. The method of claim 8, wherein the metal is copper.

10. The method of claim 9, further comprising the step of plating nickel on the copper before step (f).

11. The method of claim 8, wherein the coating comprises polystyrene and step (e) comprises dissolving the coating with a polystyrene solvent.

12. The method of claim 9, wherein the coating comprises polystyrene and step (e) comprises dissolving the coating with a polystyrene solvent.

13. The method of claim 8, wherein the coating comprises polystyrene and step (e) comprises vaporizing the coating with heat.

14. The method of claim 9, wherein the coating comprises polystyrene and step (e) comprises vaporizing the coating with heat.

15. A method for making an anode for a nickel-metal hydride battery, comprising the step of pressing metal-hydride active material particles into a porous metal substrate, the porous metal substrate formed by electrodepositing a metal in the interstitial spaces of a packed array of substantially convex and substantially electrically nonconductive particles of a material and then substantially removing the material of the particles.

16. The method of claim 15, wherein the metal is copper.

17. The method of claim 16, wherein the copper is plated with nickel.

18. The method of claim 15, further comprising the step of compacting the anode so that the metal better contacts the metal-hydride active material particles.

19. The method of claim 17, further comprising the step of compacting the anode so that the metal better contacts the metal-hydride active material particles.

20. A method for making an anode for a nickel-metal hydride battery, comprising the step of flowing a suspension of metal-hydride active material particles in a fluid through a porous metal substrate having a gradient of pore size from a pore size sufficiently large to allow the metal-hydride active material particles of the suspension to enter into the porous metal substrate but then be trapped in the porous metal substrate by smaller pores so that the pores of the porous metal substrate tend to fill with the metal-hydride active material particles, the porous metal substrate formed by electrodepositing a metal in the interstitial spaces of a packed array of substantially convex and substantially electrically nonconductive particles of a material and then substantially removing the material of the particles, the particle size of the packed array of particles being a gradient from large to small relative to the particle size of the metal-hydride active material particles.

21. The method of claim 20, wherein the metal is copper.

22. The method of claim 21, wherein the copper is plated with nickel.

23. The method of claim 20, further comprising the step of compacting the anode so that the metal better contacts the metal-hydride active material particles.

24. The method of claim 22, further comprising the step of compacting the anode so that the metal better contacts the metal-hydride active material particles.

25. A method for making a cathode for a nickel-metal hydride battery, comprising the step of pressing nickel hydroxide particles into a porous metal substrate, the porous metal substrate formed by electrodepositing a metal in the interstitial spaces of a packed array of substantially convex and substantially electrically nonconductive particles of a material and then substantially removing the material of the particles.

26. The method of claim 25, wherein the metal is copper.

27. The method of claim 26, wherein the copper is plated with nickel.

28. The method of claim 25, further comprising the step of compacting the cathode so that the metal better contacts the nickel hydroxide particles.

29. The method of claim 27, further comprising the step of compacting the anode so that the metal better contacts the nickel hydroxide particles.

30. A method for making a cathode for a nickel-metal hydride battery, comprising the step of flowing a suspension of nickel hydroxide particles in a fluid through a porous metal substrate having a gradient of pore size from a pore size sufficiently large to allow the nickel hydroxide particles of the suspension to enter into the porous metal substrate but then be trapped in the porous metal substrate by smaller pores so that the pores of the porous metal substrate tend to fill with the nickel hydroxide particles, the porous metal substrate formed by electrodepositing a metal in the interstitial spaces of a packed array of substantially convex and substantially electrically nonconductive particles of a material and then substantially removing the material of the particles, the particle size of the packed array of particles being a gradient from large to small relative to the particle size of the nickel hydroxide particles.

31. The method of claim 30, wherein the metal is copper.

32. The method of claim 31, wherein the copper is plated with nickel.

33. The method of claim 30, further comprising the step of compacting the cathode so that the metal better contacts the nickel hydroxide particles.

34. The method of claim 32, further comprising the step of compacting the anode so that the metal better contacts the nickel hydroxide particles.

* * * * *